US008389609B2

(12) United States Patent
Wang et al.

(10) Patent No.: US 8,389,609 B2
(45) Date of Patent: Mar. 5, 2013

(54) MULTIPLE-ACID-DERIVED METAL SOAPS INCORPORATED IN RUBBER COMPOSITIONS AND METHOD FOR INCORPORATING SUCH SOAPS IN RUBBER COMPOSITIONS

(75) Inventors: Xiaorong Wang, Hudson, OH (US); Victor J. Foltz, Akron, OH (US); Terrence E. Hogan, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 209 days.

(21) Appl. No.: 12/827,361

(22) Filed: Jun. 30, 2010

(65) Prior Publication Data

US 2011/0039994 A1 Feb. 17, 2011

Related U.S. Application Data

(60) Provisional application No. 61/222,406, filed on Jul. 1, 2009.

(51) Int. Cl.
    *C08G 18/48* (2006.01)
(52) U.S. Cl. ........ 524/130; 524/394; 524/399; 524/398; 524/148; 524/156; 524/166
(58) Field of Classification Search .................. 524/130
    See application file for complete search history.

(56) References Cited

U.S. PATENT DOCUMENTS

| | | |
|---|---|---|
| 2,447,064 A | 8/1948 | Arthur et al. |
| 2,599,553 A | 6/1952 | Hotten |
| 2,768,996 A | 10/1956 | Bulloff |
| 3,018,291 A | 1/1962 | Anderson et al. |
| 3,024,237 A | 3/1962 | Drummond et al. |
| 3,172,892 A | 3/1965 | Le Suer et al. |
| 3,219,666 A | 11/1965 | Norman et al. |
| 3,223,495 A | 12/1965 | Calvino et al. |
| 3,272,746 A | 9/1966 | Le Suer et al. |
| 3,361,673 A | 1/1968 | Stuart et al. |
| 3,367,864 A | 2/1968 | Elliott et al. |
| 3,443,918 A | 5/1969 | Kautsky et al. |
| 3,461,108 A | 8/1969 | Heilman et al. |
| 3,560,455 A | 2/1971 | Hazen et al. |
| 3,560,456 A | 2/1971 | Hazen et al. |
| 3,560,457 A | 2/1971 | Hazen et al. |
| 3,580,893 A | 5/1971 | Heilman |
| 3,706,704 A | 12/1972 | Heilman |
| 3,729,450 A | 4/1973 | Galiano et al. |
| 3,729,451 A | 4/1973 | Blecke et al. |
| 3,738,948 A | 6/1973 | Dunnom |
| 3,836,511 A | 9/1974 | O'Farrell et al. |
| 3,912,764 A | 10/1975 | Palmer, Jr. |
| 3,944,552 A | 3/1976 | Lawrence |
| 3,990,978 A | 11/1976 | Hill |
| 4,003,393 A | 1/1977 | Jaggard et al. |
| 4,007,128 A | 2/1977 | Poklacki |
| 4,016,931 A | 4/1977 | Cryar, Jr. |
| 4,031,014 A | 6/1977 | Griffin, Jr. |
| 4,038,207 A | 7/1977 | Poklacki et al. |
| 4,046,524 A | 9/1977 | van Hesden |
| 4,078,609 A | 3/1978 | Pavlich |
| 4,094,795 A | 6/1978 | DeMartino et al. |
| 4,104,173 A | 8/1978 | Gay et al. |
| 4,115,285 A | 9/1978 | van Hesden |
| 4,137,400 A | 1/1979 | DeMartino et al. |
| 4,143,007 A | 3/1979 | DeMartino |
| 4,143,715 A | 3/1979 | Pavlich |
| 4,152,289 A | 5/1979 | Griffin, Jr. |
| 4,152,499 A | 5/1979 | Boerzel et al. |
| 4,153,066 A | 5/1979 | Griffin, Jr. |
| 4,153,649 A | 5/1979 | Griffin, Jr. |
| 4,169,798 A | 10/1979 | DeMartino |
| 4,169,818 A | 10/1979 | DeMartino |
| 4,172,055 A | 10/1979 | DeMartino |
| 4,174,283 A | 11/1979 | Griffin, Jr. |

(Continued)

FOREIGN PATENT DOCUMENTS

| | | |
|---|---|---|
| EP | 0355895 | 2/1990 |
| EP | 0535642 | 4/1993 |

(Continued)

OTHER PUBLICATIONS

Cai, Wenwen, Apr. 13, 2011 Office Action from U.S. Appl. No. 12/347,404 (9 pp.).
Cai, Wenwen. Final Office Action U.S. Appl. No. 12/347,404 Aug. 26, 2011.
EP Office Action, Schmitt J. 08254195.2-2102 Dec. 28, 2009.
EP Office Action, Schmitt J. 08254195.2-2102 Aug. 26, 2010.
EP Search Report, Schmitt J. 08254195.2-2102 Jun. 2, 2009.
Funkhouser, Gary P. et al., "Rheological Comparison of Organogelators Based on Iron and Aluminum Complexes of Dodecylmethylphosphinic Acid and Methyl Dodecanephosphonic Acid," Langmuir, vol. 25, Issue 15, pp. 8672-8677 (2009).
Cai, Wenwen, Dec. 31, 2008 Office Action from U.S. Appl. No. 12/347,404 (8 pp.).

(Continued)

*Primary Examiner* — Doris Lee
(74) *Attorney, Agent, or Firm* — Meredith E. Hooker; Nathan T. Lewis

(57) ABSTRACT

A composition includes a polymer matrix, a multiple-acid-derived metal soap, wherein the metal has an oxidation state of +3 or +4. An associated method for making a rubber composition includes the steps of: combining a solvent and a multiple carboxylic, phosphonic, phosphoric, sulfuric, or sulfonic acid, or mixtures thereof, and mixing to form solution A; adding a source of metal ions to solution A and mixing to form a product A, the metal being selected from the metals having an oxidation state of +3 or +4, whereby product A includes a multiple-acid-derived metal soap; and combining the multiple-acid-derived metal soap with a diene rubber. A method of making a tire component includes the steps of: combining a solvent and a multiple carboxylic, phosphonic, phosphoric, sulfuric, or sulfonic acid, or mixtures thereof, and mixing to form solution A; adding a source of metal ions to solution A and mixing to form a product A, the metal being selected from the metals having an oxidation state of +3 or +4, whereby product A includes a multiple-acid-derived metal soap; combining the multiple-acid-derived metal soap with a diene rubber; and molding and vulcanizing the rubber composition into a tire component.

23 Claims, No Drawings

U.S. PATENT DOCUMENTS

| | | | |
|---|---|---|---|
| 4,200,539 A | 4/1980 | Burnham et al. |
| 4,200,540 A | 4/1980 | Burnham |
| 4,234,435 A | 11/1980 | Meinhardt et al. |
| 4,301,025 A | 11/1981 | Brady et al. |
| 4,316,810 A | 2/1982 | Burnham |
| 4,322,336 A | 3/1982 | Machurat et al. |
| 4,410,437 A | 10/1983 | Erdman |
| 4,446,281 A | 5/1984 | Takamatsu et al. |
| 4,450,254 A | 5/1984 | Isley et al. |
| 4,473,408 A | 9/1984 | Purinton, Jr. |
| 4,507,213 A | 3/1985 | Daccord et al. |
| 4,537,700 A | 8/1985 | Purinton, Jr. |
| 4,595,513 A | 6/1986 | Morgenthaler et al. |
| 4,622,155 A | 11/1986 | Harris et al. |
| 4,781,845 A | 11/1988 | Syrinek et al. |
| 4,787,994 A | 11/1988 | Thorne et al. |
| 4,791,140 A | 12/1988 | Fukasawa et al. |
| 4,795,574 A | 1/1989 | Syrinek et al. |
| 4,860,821 A | 8/1989 | Hagewood |
| 4,877,894 A | 10/1989 | Huddleston |
| 4,880,444 A | 11/1989 | Savins et al. |
| 4,910,267 A | 3/1990 | Oyama et al. |
| 4,975,497 A | 12/1990 | Tate et al. |
| 5,034,139 A | 7/1991 | Reid et al. |
| 5,057,233 A | 10/1991 | Huddleston |
| 5,110,485 A | 5/1992 | Huddleston |
| 5,112,507 A | 5/1992 | Harrison |
| 5,137,978 A | 8/1992 | Degonia et al. |
| 5,137,980 A | 8/1992 | Degonia et al. |
| 5,150,754 A | 9/1992 | Phelps et al. |
| 5,175,225 A | 12/1992 | Ruhe, Jr. |
| 5,190,675 A | 3/1993 | Gross |
| 5,202,035 A | 4/1993 | Huddleston |
| 5,271,464 A | 12/1993 | McCabe |
| 5,281,023 A | 1/1994 | Cedillo et al. |
| 5,286,799 A | 2/1994 | Harrison et al. |
| 5,319,030 A | 6/1994 | Harrison et al. |
| 5,393,309 A | 2/1995 | Cherpeck |
| 5,441,340 A | 8/1995 | Cedillo et al. |
| 5,514,645 A | 5/1996 | McCabe et al. |
| 5,523,417 A | 6/1996 | Blackborow et al. |
| 5,565,528 A | 10/1996 | Harrison et al. |
| 5,590,958 A | 1/1997 | Dearing, Sr. et al. |
| 5,616,668 A | 4/1997 | Harrison et al. |
| 5,624,182 A | 4/1997 | Dearing, Sr. et al. |
| 5,625,004 A | 4/1997 | Harrison et al. |
| 5,777,025 A | 7/1998 | Spencer et al. |
| 5,792,729 A | 8/1998 | Harrison et al. |
| 5,854,327 A | 12/1998 | Davis et al. |
| 5,916,961 A | 6/1999 | Hergenrother et al. |
| 5,922,792 A | 7/1999 | Wideman et al. |
| 5,972,852 A | 10/1999 | Robson |
| 5,972,853 A | 10/1999 | Boffa et al. |
| 5,981,662 A | 11/1999 | D'Sidocky et al. |
| 5,990,053 A | 11/1999 | Jones et al. |
| 6,004,908 A | 12/1999 | Graham et al. |
| 6,054,417 A | 4/2000 | Graham et al. |
| 6,133,354 A | 10/2000 | Wang et al. |
| 6,174,989 B1 | 1/2001 | D'Sidocky et al. |
| 6,204,354 B1 | 3/2001 | Wang et al. |
| 6,207,763 B1 | 3/2001 | Wang et al. |
| 6,261,998 B1 | 7/2001 | Amin et al. |
| 6,262,130 B1 | 7/2001 | Derian et al. |
| 6,271,409 B1 | 8/2001 | Geib |
| 6,297,201 B1 | 10/2001 | Geib |
| 6,300,288 B1 * | 10/2001 | Scharf et al. ............ 508/221 |
| 6,302,209 B1 | 10/2001 | Thompson, Sr. et al. |
| 6,342,468 B1 | 1/2002 | Geib |
| 6,350,800 B1 | 2/2002 | Wang et al. |
| 6,353,054 B1 | 3/2002 | Wang et al. |
| 6,359,064 B1 | 3/2002 | Wang et al. |
| 6,369,166 B1 | 4/2002 | Wang et al. |
| 6,372,855 B1 | 4/2002 | Chino et al. |
| 6,384,134 B1 | 5/2002 | Hall et al. |
| 6,401,776 B1 | 6/2002 | Wang et al. |
| 6,403,724 B1 | 6/2002 | Wang |
| 6,417,259 B1 | 7/2002 | Wang et al. |
| 6,458,881 B1 | 10/2002 | Pan et al. |
| 6,602,828 B2 | 8/2003 | Amin et al. |
| 6,632,781 B2 | 10/2003 | Harrison et al. |
| 6,699,813 B2 | 3/2004 | Luo et al. |
| 6,706,823 B2 | 3/2004 | Wang et al. |
| 6,719,053 B2 | 4/2004 | Thompson |
| 6,849,581 B1 | 2/2005 | Thompson et al. |
| 7,314,850 B2 | 1/2008 | Taylor et al. |
| 7,328,744 B2 | 2/2008 | Taylor et al. |
| 7,429,393 B2 | 9/2008 | Wang et al. |
| 7,521,400 B2 | 4/2009 | Samuel |
| 7,534,745 B2 | 5/2009 | Taylor et al. |
| 7,700,673 B2 | 4/2010 | Wang et al. |
| 2002/0022085 A1 | 2/2002 | Thise et al. |
| 2002/0188064 A1 | 12/2002 | Wang et al. |
| 2003/0130398 A1 | 7/2003 | Wang |
| 2003/0130401 A1 | 7/2003 | Lin et al. |
| 2004/0144464 A1 | 7/2004 | Rhyne et al. |
| 2005/0022915 A1 | 2/2005 | Bowen, III et al. |
| 2006/0223945 A1 | 10/2006 | Hollingshurst et al. |
| 2007/0015853 A1 | 1/2007 | Weng et al. |
| 2007/0208122 A1 | 9/2007 | Bhandarkar et al. |
| 2008/0153972 A1 | 6/2008 | Wang et al. |

FOREIGN PATENT DOCUMENTS

| | | |
|---|---|---|
| EP | 0542380 | 5/1993 |
| EP | 0570159 | 11/1993 |
| EP | 0602863 | 6/1994 |
| EP | 0864606 | 9/1998 |
| EP | 1270657 | 1/2003 |
| EP | 1803771 | 7/2007 |
| GB | 695113 | 8/1953 |
| JP | 2006063094 A | 3/2006 |
| WO | 9008170 | 7/1990 |
| WO | WO/02/96677 | 5/2002 |
| WO | 2004/058874 | 7/2004 |
| WO | 2007070063 | 6/2007 |

OTHER PUBLICATIONS

English Translation of Nov. 30, 2011 Office Action from Chinese Patent Application No. 200810191041.8 (6 pp.).

Bauer, Walter H. et al., "Flow Properties and Structure of Peptized Aluminum Soap-Hydrocarbon Gels", J. Phy. Chem., vol. 62, pp. 106-110 (Jan. 1958).

Bauer, Walter H. et al., "Entrance Effects in Capillary Flow of Aluminum Dilaurate-Toluene Gels", J. Phy. Chem., vol. 62, pp. 1245-1247 (Oct. 1958).

Gaskins, Frederick H. et al., "Rheology of Aluminum Dilaurate in Toluene", Transactions of the Society of Rheology, vol. 13, No. 1, pp. 17-38 (1969).

George, Mathew et al., "Organogels with Complexes of Ions and Phosphorus-Containing Amphiphiles as Gelators. Spontaneous Gelation by in Situ Complexation," Langmuir, 24, pp. 3537-3544 (2008).

Harple, Warren W. et al., "Infrared Absorption Spectra of Aluminum Soaps", Analytical Chemistry, vol. 24, No. 4, pp. 635-638 (Apr. 1952).

Ludke, Willard O. et al., "Mechanism of Peptization of Aluminum Soap-Hydrocarbon Gels Based Upon Infrared Studies", J. Phy. Chem. vol. 59, pp. 222-225 (Mar. 1955).

McGee, Charles G., "Aluminum Monolaurate and Proposed Structures for Aluminum Soaps", Am. Chem. Soc. vol. 71, pp. 278-282 (Jan. 1949).

Mohajer, Y. et al., "New Polyisobutylene-Based Model Elastomeric Ionomers. VI. The Effect of Excess Neutralizing Agents on Solid-State Mechanical Properties", Applied Polymer Science, vol. 29, No. 6, pp. 1943-1950 (1984).

Mysels, Karol J., "Studies of Aluminum Soaps: IX. Electron Microscope View of Lyophilized Aluminum Laurate", The Journal of General Physiology, pp. 159-161 (Jul. 15, 1946).

Nora, Angelo et al., "Metallic Soaps", internet article, XP-002524032, pp. 1-16 (Sep. 15, 2001).

Trappe, V. et al., "Scaling of the Viscoelasticity of Weakly Attractive Particles", Physical Review Letters, vol. 85, No. 2, pp. 449-452 (Jul. 10, 2000).

Wang, Xiaorong et al., "Gelling nature of aluminum soaps in oils," Journal of Colloid and Interface Science, 331, pp. 335-342 (Nov. 13, 2008).

Weber, Neill et al., "Flow Properties of Aluminum Dilaurate-Toluene Gels", J. Phys. Chem., vol. 60, pp. 270-273 (Mar. 1956).

Weill, J. et al., "Reaction du Polyisobutene Chlore Sur L'Anhydride Maleique: Mecanisme; Catalyse Par L'Anhydride Dichloromaleique", Revue de L'Institut Francais due Petrole, vol. 40, No. 1, pp. 77-89 [Jan.-Feb. 1985].

Database WPI Week 199001, Thomson Scientific, London, GB; AN 1990-004108 (1 pg.).

Admasu, Atnaf S., Jan. 21, 2009 Office Action from U.S. Appl. No. 11/615,659 (10 pp.).

Admasu, Atnaf S., Aug. 18, 2009 Final Office Action from U.S. Appl. No. 11/615,659 (8 pp.).

Admasu, Atnaf S., Nov. 10, 2009 Advisory Action from U.S. Appl. No. 11/615,659 (8 pp.).

Scott, Angela C., Nov. 28, 2007 Office Action from U.S. Appl. No. 11/646,981 (7 pp.).

Scott, Angela C., Jun. 9, 2008 Final Office Action from U.S. Appl. No. 11/646,981 (6 pp.).

Scott, Angela C., Nov. 24, 2008 Office Action from U.S. Appl. No. 11/646,981 (5 pp.).

Scott, Angela C., Jul. 7, 2009 Office Action from U.S. Appl. No. 11/646,981 (6 pp.).

Scott, Angela C., Jan. 8, 2010 Final Office Action from U.S. Appl. No. 11/646,981 (6 pp.).

Scott, Angela C., Mar. 26, 2010 Office Action from U.S. Appl. No. 11/646,981 (6 pp.).

Scott, Angela C., Sep. 2, 2010 Final Office Action from U.S. Appl. No. 11/646,981 (7 pp.).

Sun, Yuejian, English translation of Oct. 8, 2010 First Office Action from Chinese Patent Application No. 200610170337.2 (10 pp.).

Mettler, Rolf-Martin, Apr. 10, 2007 extended European search report from European Patent Application No. 06256456.2 (6 pp.).

Jan. 9, 2008 Office Action from European Patent Application No. 06256456.2 (6 pp.).

Schmitt, Johannes, Jun. 2, 2009 extended European search report from European Patent Application No. 08254196.2 (7 pp.).

Schmitt, J., Dec. 28, 2009 Office Action from European Patent Application No. 08254196.2 (1 pg.).

Schmitt, Johannes, Aug. 26, 2010 Office Action from European Patent Application No. 08254196.2 (5 pp.).

Kim, Gye Sook, Feb. 2, 2010 International Search Report from PCT/US2009/048834 (4 pp.).

Ow, Say Kyoun, "Investigation of the Role of Sulfate Ions in the Reaction Between Tetrahydroabietic Acid Monolayers and Aluminum Ions," The Institute of Paper Chemistry, Doctor's Dissertation, pp. 1-156 (Jun. 1974).

Cai, Wenwen, Aug. 26, 2011 Final Office Action from U.S. Appl. No. 12/347,404 (8 pp.).

Notification of First Office Action, The State Intellectual Property Office of P.R. China, Application No. 200980132972.3, Aug. 28, 2012.

Lowe, Chelsea M., Non-Final Rejection, United States Patent and Trademark Office, U.S. Appl. No. 13/000,696, Sep. 11, 2012.

Machine translation of JP 2006063094 A (translated Jan. 8, 2013).

Non-Final Rejection, U.S. Appl. No. 12/347,404 (notification date Jan. 22, 2013).

\* cited by examiner

MULTIPLE-ACID-DERIVED METAL SOAPS INCORPORATED IN RUBBER COMPOSITIONS AND METHOD FOR INCORPORATING SUCH SOAPS IN RUBBER COMPOSITIONS

CROSS-REFERENCE TO RELATED APPLICATION

This application claims the benefit of priority from U.S. Provisional Application No. 61/222,406, filed on Jul. 1, 2009. This prior application is hereby incorporated into the present application by reference.

FIELD

The technology discussed herein relates generally to additives for rubber compositions.

BACKGROUND

In the tire industry, rubber compositions are engineered to have a balance of properties; for example, durability (e.g. tensile strength and tear resistance), rolling resistance, and traction. Additives that improve the traction and/or durability characteristics of tires and also maintain a good balance of other properties are highly desirable.

SUMMARY

In one aspect of the technology disclosed herein, a composition includes a polymer matrix, a multiple-acid-derived metal soap, wherein the metal has an oxidation state of +3 or +4.

An associated method for making a rubber composition includes the steps of: combining a solvent and a multiple carboxylic, phosphonic, phosphoric, sulfuric, or sulfonic acid, or mixtures thereof, and mixing to form solution A; adding a source of metal ions to solution A and mixing to form a product A, the metal being selected from the metals having an oxidation state of +3 or +4, whereby product A includes a multiple-acid-derived metal soap; and combining the multiple-acid-derived metal soap with a diene rubber.

In another embodiment, a method of making a tire component includes the steps of: combining a solvent and a multiple carboxylic, phosphoric, phosphonic, sulfuric, or sulfonic acid, or mixtures thereof, and mixing to form solution A; adding a source of metal ions to solution A and mixing to form a product A, the metal being selected from the metals having an oxidation state of +3 or +4, whereby product A includes a multiple-acid-derived metal soap; combining the multiple-acid-derived metal soap with a diene rubber; and molding and vulcanizing the rubber composition into a tire component.

It should be understood that the term "a" means "one or more." It should also be understood that the use of more than one polar solvent, base, carboxylic acid, transition metal, etc. may be used in accordance with the invention, unless otherwise stated. By di-soap is meant a soap with two acid-derived groups. Correspondingly, mono- and tri-soaps are soaps with one and three acid-derived groups. By acid-derived group is meant an acid functionality with the hydrogen atom removed. For example, a multiple-carboxylic-acid-derived group may be represented by the —$O_2CRCO_2$— radical. Multiple-carboxylic-acid-derived metal di-soap means a group of species with a metal atom bonded to two carboxylate groups, wherein the carboxylate groups may be linked by an R group (thus forming a cyclic multiple-acid-derived metal di-soap), or the metal atom is linked to one acid-derived group on two different multiple-carboxylic-acid-derived groups. The terms di-, tri-, or multi-acid soap, and di-, tri-, or multi-functional soap may respectively be used as a shorthand designation for a soap having two, three, or multiple-acid-derived groups attached to a metal atom. The compositions disclosed herein and the compositions made by the methods disclosed herein may be incorporated into a tire tread, sidewall, or other tire portion.

DETAILED DESCRIPTION

Unexpectedly, it was discovered that by adding certain multiple-acid-derived metal soaps to diene rubber tire treads, significant improvement in the wet traction properties was obtained along with a good balance of other properties.

Traditional metal soaps are typically small molecules that can aggregate together. Disclosed herein are technologies involving the use of multiple-acid-derived metal soap materials as additives for filled rubber compounds. Without being bound by theory, these multiple-acid-derived metal soaps, such as aluminum di-acid-derived soaps, are believed to display polymer-like qualities that are believed to contribute to their unexpected property enhancing effects in rubber compositions.

The example di-acid-derived and multiple-acid-derived metal soaps have at least two acid-derived groups (such as carboxyl groups) and at least one metal hydroxide that are believed to form extended hydrogen bonded networks. Upon addition to a polymer matrix, the metal soaps form a second hydrogen bonded network. Such additives can significantly improve wet traction properties.

In an embodiment, a mixture of mono-acid-derived metal soaps and multiple-acid-derived metal soaps may be used. For example, the metal may be the same in both soaps, or different. For example, the mono-acid-derived metal soap may be bis(dodecanoate) aluminum hydroxide, and the multiple-acid-derived metal soap may be aluminum hydroxide didoecanoate.

When dispersed in organic non-polar solvents, certain multiple-acid-derived metal soaps, such as aluminum soaps, present somewhat akin to polymers in their elastic liquid behavior. Furthermore, in non-polar solvents, aluminum soaps form a hydrogen bond network formation, such as a cluster-like assembly, for example, the structure depicted in formula II below. The hydrogen bonding depicted in formula II below could further allow for the assembly of the soap molecules into micelles or other forms. This results in a highly viscous elastic liquid or gel. It is believed that certain multiple-acid-derived metal soaps with +3 or +4 oxidation states, also display a similar type of characteristic assembly in non-polar solvents as aluminum soaps. Specific metals selected from these metals +3 or +4 oxidation states are those that when formed into multiple-acid-derived metal soaps will be soluble in non-polar solvents and form a cluster-like assembly.

In an embodiment, the multiple-acid-derived metal soap forms a mixture of linear and cyclic metal carboxylate species depicted in formula Ia and Ib respectively. In the case of the Ia configuration the material may be described as a polymer or oligomer wherein the "mer" units are as depicted in formula Ia.

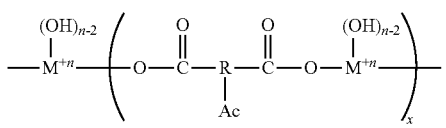

Ia

The variable "x" is a positive integer, and may range from about 1 to about 100, such as, about 2 to about 5, about 3 to about 10, about 5 to about 50, or about 15 to about 80.

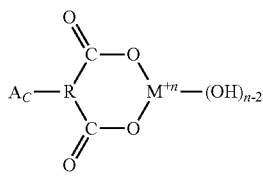

Ib

Depending on the stoichiometry, the terminal ends of the linear species of the multiple-acid-derived metal soap depicted in Ia may be either a carboxylic acid group or $RCO_2M(OH)_2$.

M is a metal with an oxidation state, n, of +3 or +4, and R is a divalent organic group. Ac is optional, and represents one or more moieties that include a carboxylic-, phosphoric-, phosphonic-, sulfuric-, or sulfonic-acid-derived group, which may also be bonded to a metal atom. Ac is present in tri-acid, tetra-acid, and higher acid embodiments. The letter "n" corresponds to the oxidation state of the metal.

The metal M of the multiple-acid-derived multiple-acid-derived metal soaps includes metals that have oxidation states of +3 or +4, like scandium (Sc), yttrium (Y), lanthanum (La), actinium (Ac), chromium (Cr), iron (Fe), cobalt (Co), ruthenium (Ru), iridium (Ir), gallium (Ga), indium (In), titanium (Ti), manganese (Mn), germanium (Ge), tin (Sn), aluminum (Al) and lead (Pb). In some embodiments, the multiple-acid-derived metal soaps are not soluble in polar solvents and do not dissociate into ions in polar solvents, such as water. Soaps that are soluble in polar solvents include alkali metals and most alkaline earth metals, including, lithium (Li), sodium (Na), potassium (K), rubidium (Rb), cesium (Cs), and francium (Fr); beryllium (Be), magnesium (Mg), calcium (Ca), strontium (Sr), barium (Ba) and radium (Ra), and some transition metals, such as zinc (Zn), mercury (Hg), and cadmium (Cd). In some embodiments of the composition described herein, multiple-acid-derived metal soaps may include metals of the Group III (IUPAC Group 13) and transition metals, excluding zinc (Zn), nickel (Ni), and copper (Cu).

Divalent organic groups, R, may include a hydrocarbylene group or substituted hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group containing from 1 carbon atom, or the appropriate minimum number of carbon atoms to form the group, up to about 50 carbon atoms, such as 1-5 carbon atoms, 6-40 carbon atoms, 11-30, or 18-45. Substituted hydrocarbylene groups include hydrocarbylene groups in which one or more hydrogen atoms have been replaced by a substituent such as an alkyl group. The divalent organic groups may also contain one or more heteroatoms such as, but not limited to, nitrogen, oxygen, boron, silicon, sulfur, and phosphorus atoms.

Each R group may be independently selected. For example, one R group may be a six carbon atom hydrocarbon chain and another R group may be a seven carbon atom hydrocarbon chain. Including different R groups in the final product can be done by mixing different multiple acids with the metal source.

The multiple-carboxylic-acid derived group ($O_2CRCO_2$) may, for example, may be derived from a $C_2$ to $C_5$ di-acid, a $C_6$ to $C_{22}$ di-acid, or higher fatty di-acids such as $C_{23}$ to $C_{50}$ may also be used. Examples of di-acids include 1,2-ethanedioic acid, 1,3-propanedioic acid, 1,4-butanedioic acid, 1,5-pentanedioic acid, 1,6-hexane dioic acid, 1,7-heptanedioic acid, 1,8-octanedioic acid, 1,9-nonanedioic acid, 1,10-decanedioic acid, 1,11-undecanedioic acid, 1,12-dodecanedioic acid, 1,13-tridecanedioic acid, 1,14-tetradecanedioic acid, 1,15-pentadecanedioic acid 1,16-hexadecanedioic acid, 1,17-heptadecanedioic acid, 1,18-octadecanedioic acid, 1,19-nonadecanedioic acid, 1,30-triacontanedioic acid, benzene-1,2-dicarboxylic acid, benzene 1,3-dicarboxylic acid, and benzene 1,4-dicarboxylic acid. In one embodiment the acid is 1,12-dodecanedioic acid.

Tri-acids and acids containing four or more acid groups may also be used, and these embodiments are present when one or more Ac is present in the formula. Ac represents an organic moiety that includes at least one carboxyl group. The Ac group may be bonded to terminal carbons, non-terminal carbons, or both. Ac can also be a phosphoric-, phosphonic-, sulfuric-, or sulfonic-acid-derived group.

In an embodiment, tri-functional materials that have three carboxyl groups may form branched chain structures with aluminum atoms. Tetra- and higher multiple-acid-derived materials may also form branched chain structures. Some examples of multi-acid materials include polyacrylic acid (PAA) and carboxylated polybutadiene. In materials that have more than two acid groups that form soaps with metal atoms such as aluminum, the branched chains may form star-like, branch-like, or dendrite-like polymeric aluminum soap-like materials.

The variable "n-2" may be, for example, 1 or 2, depending on the oxidation state of the metal M. For example, when M is aluminum (III) or iron (III), "n-2" would be 1. When M is titanium (IV), n-2 would be 2. In some embodiments M is a Group III (IUPAC Group 13) metal or transition metal, excluding zinc, copper, and nickel.

In most embodiments, the multiple-acid-derived metal soap will exist as a mixture of linear and cyclic species in equilibrium. The ratio of linear (formula Ia) to cyclic (formula Ib) multiple-acid-derived metal soap may, for example, be 1:0, 1000:1, 100:1, 50:1, 10:1, 2:1, 1:1, 1:2, 1:10, 1:50, 1:100, 1:1000, or 0:1. For example, the amount of linear (formula Ia) multiple-acid-derived metal soap may range from about 5% to about 100%, such as about 50% to about 98%, about 80% to about 99%, or about 90% to 100% of the total amount of multiple-acid-derived metal soap in the composition. Alternatively, the amount of cyclic (formula Ib) multiple-acid-derived metal soap may range from about 5% to about 100%, such as about 50% to about 98%, about 80% to about 99%, or about 90% to 100% of the total amount of multiple-acid-derived metal soap in the composition. In multiple-acid-derived soaps where the R group is long, e.g., greater than 6, greater than 10, or greater than 15 carbon atoms, the linear formation of formula Ia will be favored because a longer chain will tend to destabilize the cyclic formation of formula Ib.

The multiple-acid-derived groups have carboxyl groups bond with aluminum atoms through substitution. Upon addition to a polymer matrix, hydrogen bonding occurs between the metal carboxylate species, and those metal carboxylate species in principle (without being bound by theory) form a second-network inside the polymer matrix.

For example, and without being bound by theory, M and R of formula I may be any combination of metals, and organic moieties, respectively, that may form and/or are capable of forming a cluster-like structure, such as a micelle-like structure or a structure as depicted in formula II in a non-polar solvent such as in a rubber composition.

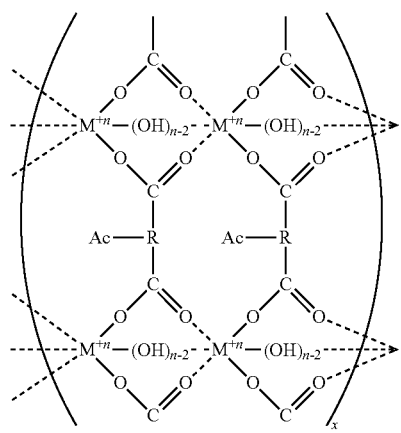

Formula II may also be represented as:

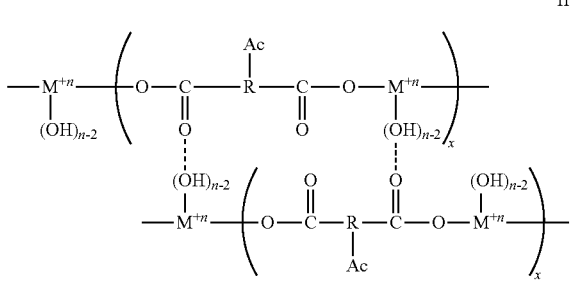

In addition, an aggregate of structures of formula II may further form into a macro-structure that is a micelle, wherein the non-polar R groups extend to the outside of the macro-structure.

In an embodiment, the di-functional materials are broadly considered polymeric or oligomeric materials, because they contain repeating "mer" units. Herein the group in parentheses is considered the "mer" unit. The variable "x" designates the number of repeating units. The variable "x" is a positive integer, and may range from about 1 to about 100, such as, about 2 to about 5, about 3 to about 10, about 5 to about 50, or about 15 to about 80. Without being bound by theory, to achieve higher numbers of mer units, (e.g., more than about 3, more than about 5, or more than about 15) the linear formation (formula Ia) should primarily comprise the multiple-acid-derived metal soap, and the cyclic formation (formula Ib) should be kept low.

The materials contain soap structures that can form a macro-network through hydrogen bonding, such as 1,12-dodecanedioic aluminum soap. Formula IIa shows a polymer-like structure of a dicarboxylic acid metal soap, wherein the two carboxyl groups form linear chains with aluminum atoms through di-substitution, and hydrogen bonding occurs.

In an embodiment, tri-functional materials that have three carboxyl groups may form branched chain structures with aluminum atoms. Tetra- and higher multiple-acid-derived materials may also form branched chain structures. Some examples of multi-acid materials include polyacrylic acid (PAA) and polybutadiene carboxylic acid. In materials that have more than two acid groups that form soaps with metal atoms such as aluminum, the branched chains may form star-like, branch-like, or dendrite-like polymeric aluminum soap-like materials.

Particular examples of the metals that may form and/or are capable of forming the structure of formula II or other star-like, branch-like, or dendrite-like structures are aluminum, iron, and titanium. Other metals that may be capable of forming these structures are metals with a +3 or +4 oxidation state. Particular examples of R groups include straight or branched hydrocarbon chains, including straight or branched hydrocarbons that include various organic or inorganic functional groups.

In another embodiment, combinations of di-acid derived metal soaps and materials that have more than two acid derived groups may be used. In some embodiments the multiple-acid-derived metal soap is halogen-free.

Without being bound by theory, the network formed from di-acid derived metal soap is more expansive in contrast to the structure believed to be formed by mono acid-derived aluminum soaps as shown below in formula III (wherein M is Al(III)):

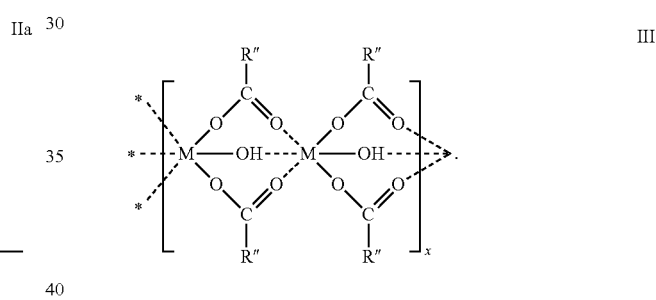

Multiple-acid-derived metal soaps that include an R group that contains one or more double bonds may provide additional benefits when combined with a rubber matrix and vulcanized. Without being bound by theory, the double bond is believed to contribute to improved cross-linking with diene rubber matrices. Such multiple-acid-derived metal soaps contain at least one unit of unsaturation and may include conjugated units of unsaturation.

In an alternative embodiment, the multiple-acid-derived metal soap is a phosphonic acid or phosphoric acid-derived metal soap. The multiple-phosphonic-acid-derived metal soap forms a mixture of linear and cyclic species depicted in formula IIIa and IIIb, respectively. In a bisphosphonate ester embodiment, a multiple-phosphoric-acid-derived metal soap may form a mixture of linear and cyclic species depicted in formula IIIc and IIId, respectively.

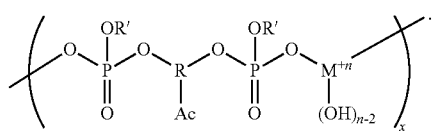

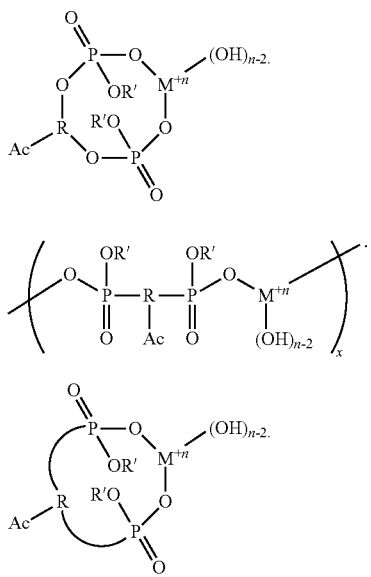

IIIb

IIIc

IIId wherein x, n, R and Ac are as defined above, and, as stated above, Ac is optional. Depending on the stoichiometry, the terminal ends of the multiple-acid-derived metal soap in formula IIIa may be either a ROPO$_3$H or RPO$_3$M$^{+n}$(OH)$_{n-1}$.

M is a metal with an oxidation state, n, of +3 or +4, and R' is a monovalent organic group or hydrogen. Monovalent organic groups may include hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 20 carbon atoms. These hydrocarbyl groups may contain heteroatoms such as, but not limited to, nitrogen, oxygen, silicon, sulfur, and phosphorus atoms.

In another embodiment, a sulfonic- or sulfuric-acid-derived group is used in place of the phosphoric acid groups in the previously described embodiment.

In an embodiment, the multiple-acid-derived metal soaps are combined with rubber in a rubber composition. The rubbers may, for example, be one or more of conjugated dienes, such as styrene-butadiene rubber, butadiene rubber, isoprene rubber, or natural rubber. The diene rubber may, for example, comprise any conventionally employed treadstock rubber. Such rubbers are well known to those skilled in the art and include, but are not limited to, natural rubber, synthetic polyisoprene rubber, styrene-butadiene rubber (SBR), styrene-isoprene rubber, styrene-isoprene-butadiene rubber, butadiene-isoprene rubber, polybutadiene (BR), acrylonitrile-butadiene rubber (NBR), silicone rubber, fluoroelastomers, ethylene acrylic rubber, ethylene propylene rubber (EPR), ethylene propylene diene monomer (EPDM) rubber, butyl rubber, polychloroprene, hydrogenated nitrile rubber, and mixtures thereof.

The multiple-acid-derived metal soap may be present in the rubber composition in amounts of 1 to 200 phr, such as 5-100 phr, 10-100 phr, 5-30 phr, or 15-50 phr, for example. These amounts are in contrast to zinc soaps that have been used for years in the rubber industry. Such zinc soaps are only soluble up to about 4 phr in typical diene rubbers. Above about 4 phr the zinc soaps rise to the surface of the rubber in an effect known as "bloom." The multiple-acid-derived metal soaps described herein are preferably used in amounts up to 200 phr that avoid any "bloom."

The multiple-acid-derived metal soap polymer materials discussed herein may have molecular weights (M$_n$) of 100 to 2,000,000; for example, 200 to 500,000; or 300 to 100,000; 500 to 200,000; or 100,000 to 500,000. Achieving higher molecular weights is partially dependent on having higher proportions of the linear formation (formula Ia), which in turn is partially dependent on having a longer R group, as explained above.

The rubber composition may include other additives known to those of skill in the art. An illustrative diene rubber composition that includes a multiple-acid-derived metal soap additive also includes (a) an optional process oil, and (b) one or more components selected from the group consisting of carbon black, silica, vulcanizing agent, vulcanization accelerator, tackifier resin, antioxidant, fatty acids, wax, peptizer, vulcanization retarder, activator, processing additive, plasticizer, pigments, and antiozonant.

An exemplary method of making the multiple-acid-derived metal soap includes: combining a polar solvent, a base, and a carboxylic di-, tri-, or other multiple acid and mixing these to form a Solution A. A source of metal ions is then added to Solution A and mixed to form Product A. The source of metal ions, may previously be dissolved in a polar solvent prior to its addition (in solution) to Solution A. The metal, for example, has an oxidation state of +3 or +4, or in other embodiments may be a Group III (IUPAC Group 13) or transition metal excluding zinc, nickel, and copper. The metal may be selected from the group consisting of aluminum, iron, titanium, and cobalt. Product A is isolated from solution, and then is combined with a diene rubber composition.

A more specific exemplary method of making a rubber composition includes synthesizing a multiple-acid-derived metal soap and combining it with a diene rubber. In an exemplary first step, a polar solvent, a base, and an organic species that contains a carboxylic acid group are mixed together to form a Solution A. The base is added to neutralize the acid, facilitating dissolution. The base may be added so that the pH of Solution A prior to adding the source of metal ions in solution is basic. Examples of polar solvents include, but are not limited to, water, THF, acetone, acetonitrile, DMF, DMSO, n-butanol, isopropanol, n-propanol, ethanol, or methanol. Exemplary bases include, but are not limited to, sodium hydroxide, potassium hydroxide, potassium carbonate, calcium carbonate, and ammonia.

In an embodiment, the carboxylic di-, tri-, or other multiple acid may be a saturated or monounsaturated C$_2$ to C$_5$ carboxylic acid, a saturated or monounsaturated C$_6$ to C$_{22}$ carboxylic acid, a saturated or monounsaturated C$_{11}$ to C$_{22}$, or higher saturated or monounsaturated acids such as C$_{23}$ to C$_{50}$. A specific example is dodecanedioic acid. Other example diacids include: 1,2-ethanedioic acid, 1,3-propanedioic acid, 1,4-butanedioic acid, 1,5-pentanedioic acid, 1,6-hexane dioic acid, 1,7-heptanedioic acid, 1,8-octanedioic acid, 1,9-nonanedioic acid, 1,10-decanedioic acid, 1,11-undecanedioic acid, 1,12-dodecanedioic acid, 1,13-tridecanedioic acid, 1,14-tetradecanedioic acid, 1,15-pentadecanedioic acid 1,16-hexadecanedioic acid, 1,17-heptadecanedioic acid, 1,18-octadecanedioic acid, 1,19-nonadecanedioic acid, 1,30-triacontanedioic acid, benzene-1,2-dicarboxylic acid, benzene 1,3-dicarboxylic acid, and benzene 1,4-dicarboxylic acid. Tri- and higher example acids include polyacrylic acid, carboxylated polybutadiene, citric acid, isocitric acid, aconitic acid, propane-1,2,3-tricarboxylic acid, dodecane-1,7, 12-tricarboxylic acid, trimesic acid, and mellitic acid.

The acid may also contain multiple double bonds such as two or three double bonds in the alkyl chain, such as sulfur-curable double bonds. In examples that include multiple double bonds, the double bonds may be conjugated. At least one double bond or all double bonds may be between two non-terminal carbons in an alkyl chain between two terminal carboxylic acid groups. For example, the double bond may be at or near the middle, such as in dioleic acid In another step of the exemplary method, a source of metal ions in solution is prepared. This may be done by adding a source of such metal ions to a polar solvent such as water and forming a Solution B. The source of metal ions may, for example, correspond to the formula:

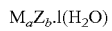

$$M_a Z_b \cdot l(H_2O)$$

with M being a metal as described above; and where Z is selected from the group consisting of potassium sulfate, hydroxide, sulfate, and phosphate; a and b are independently selected integers from 1 to about 20, and l is an integer from 0 to about 30. For example, aluminum potassium sulfate dodecahydrate is known to be an inexpensive and effective source of aluminum metal ions.

Solution A and Solution B are then mixed together to form Product A. Stirring and heating may be used to induce the metal ions of Solution B to associate with the carboxylic acid group containing species, thereby creating a multiple-acid-derived metal soap that is insoluble in the polar solvent. Product A includes the multiple-acid-derived metal soap, and may include other reaction residues such as potassium sulfate and/or water.

It should be noted that the multiple-acid-derived metal soap may be synthesized in a manner to promote hydrogen bond network formation. For example, in aluminum diacid soaps, the di-soap species is the molecule that is believed to form into the structure of formula II. However, the mono- and tri-aluminum diacid soaps do not assemble into these structures. Thus, maximizing the formation of the aluminum di-soap is advantageous in this regard. For the other multiple-acid-derived metal soaps generally represented by formula Ia and Ib, a species having a single OH pending from the metal ion with the remaining valences filled with organic moieties may be selected.

Molecules of aluminum di-soap can be encouraged to form by slowly adding Solution B to Solution A, as opposed to quickly combining the two solutions. Varying the temperature and concentration of Solution A and B are other ways to affect the formation of mono-, di-, or tri-soaps. The number of acid groups bonded to the metal M can also be controlled by varying the relative amounts of metal ion and acid molecules. For example, formation of di-acid metal polymer-like material can be encouraged by adding a source of aluminum and a source of diacid molecules in a molar ratio of about 1:0.50 to about 1:5 aluminum ions to diacid molecules, such as about 1:0.60 to about 1:2, or about 1:0.75 to about 1:1.25.

In a further step of the exemplary method, Product A is isolated from the solvent. For example, dodecanedioic aluminum soap can be isolated by washing Product A with water and drying it, thereby resulting in a powdery product of high purity. Other reaction residues in Product A are washed away with water.

Optionally, in another step of the exemplary method, the isolated multiple-acid-derived metal soap is dissolved in a non-polar solvent to form solution X. The non-polar solvent, for example, may be hexane, benzene, cyclohexane, or toluene. Stirring and heating may be used to encourage dissolution. The multiple-acid-derived metal soap molecules described above may form into a hydrogen bond network formation, such as a micelle, dendrite, star-like, or branch-like structure, for example the structure depicted in formula II.

The phosphoric, phosphonic, sulfonic or sulfuric multiple-acid-derived embodiments may be made in a similar way as described above, as will be apparent to those of skill in the art. Reference is also made to the following publication that describes synthesis of sulfuric or sulfonic multiple acids: Jerry March, Advanced Organic Chemistry, p. 1297 John Wiley & Sons, NY (4$^{th}$ Ed. 1992), which would also inform one of skill in the art how to make the multiple-phosphoric and -phosphonic acids.

In a further step to the exemplary method, the multiple-acid-derived metal soaps are combined with a diene rubber composition. Alternatively, solution X is combined with a diene rubber composition. Any of the diene rubbers previously mentioned may be selected. Again, stirring and heating may be used to encourage dissolving the multiple-acid-derived metal soap solution in the rubber composition.

The rubber and the multiple-acid-derived metal soap may be compounded by methods generally known in the rubber compounding art, such as mixing the rubbery matrix polymer and the multiple-acid-derived metal soap with conventional amounts of various commonly used additive materials, using standard rubber mixing equipment and procedures. Common additives include, for example, curing agents, activators, retarders and accelerators, processing additives, such as oils, resins, including tackifying resins, plasticizers, pigments, additional fillers, fatty acid, zinc oxide, waxes, antioxidants, anti-ozonants, and peptizing agents. As known to those skilled in the art, depending on the intended use of the rubber composition, the additives mentioned above are selected and commonly used in conventional amounts, in addition to other conventional rubber additives including, for example, other fillers, plasticizers, antioxidants, cure agents and the like, using standard rubber mixing equipment and procedures. For example, the diene rubber composition may be prepared by emulsion, solution, or bulk polymerization according to known suitable methods. Generally, mixing of components is accomplished in an internal mixer such as a Brabender or small size Banbury mixer, and because of the shear forces involved, the formulation process generally is exothermic and high temperatures are normal.

In one embodiment, a rubber composition is prepared by the steps of (a) mixing together at a temperature of about 110° C. to about 200° C. (drop temperature) in the absence of added sulfur and cure agents, an elastomer, a reinforcing filler comprising silica or a mixture thereof with carbon black, (b) allowing the mixture to cool below the mixing temperature; (c) mixing the mixture obtained in step (b) at a temperature lower than a vulcanization temperature, with a cure agent and an effective amount of sulfur to achieve a satisfactory cure; and (d) curing the mixture obtained in step (c). The compound is usually cured at about 140° C. to about 190° C. for about 5 to about 120 minutes. The curing step may be performed after the composition is transferred to a mold. The drop temperature for mixing together the components also can be about 145° C. to about 190° C. or about 155° C. to about 180° C.

The initial mixing step can include at least two substeps. That is, the initial mixing step can comprise the substeps of (i) mixing together at a temperature of about 130° C. to about 180° C., the elastomer, at least a portion of the filler, (ii) cooling the mixture below the mixing temperature; and (iii) mixing the mixture obtained in step (ii) with the remainder of the filler, if any. The temperatures achieved by the at least two substeps can be the same or different from each other, within the temperature range.

The method can further include a remill step in which either no ingredients are added to the first mixture, or non-curing ingredients are added, in order to reduce the compound viscosity and improve the dispersion of the reinforcing filler. The multiple-acid-derived metal soap can also be added in the remill step. The drop temperature of the remill step is typically about 130° C. to about 175° C., such as about 145° C. to about 165° C.

The final step of the mixing process is the addition of cure agents to the mixture, including an effective amount of sulfur to achieve a satisfactory cure of the final compound. The temperature at which the final mixture is mixed should be below the vulcanization temperature in order to avoid unwanted precure of the compound. Therefore, the temperature of the final mixing step should not exceed about 120° C. and is typically about 40° C. to about 120° C., suitably about 60° C. to about 110° C. and, especially, about 75° C. to about 100° C.

An illustrative rubber composition comprising the multiple-acid-derived metal soaps described above also includes (a) a rubber matrix, (b) an optional oil, and (c) one or more components selected from the group consisting of carbon black, silica, vulcanizing agent, vulcanization accelerator, tackifier resin, antioxidant, fatty acids, wax, peptizer, vulcanization retarder, activator, processing additive, plasticizer, pigments, and antiozonant. Various rubber products such as tires and power belts may be manufactured based on this composition.

Examples of the vulcanizing agent include sulfur and sulfur donating compounds. The amount of the vulcanizing agent used in the rubber composition may be from 0.1 to 10 parts by weight, or from 1 to 5 parts by weight per 100 parts by weight of the rubber component (phr). Specific examples include 1.5, 1.7, 1.87, and 2.0 phr.

The vulcanization accelerator is not particularly limited. Numerous accelerators are known in the art and include, but are not limited to, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), 2-(morpholinothio)benzothiazole (MBS). Example amounts of accelerators include 0.25, 0.5, 1.0, 1.5, 1.65, and 2.0 phr. More than one accelerator may also be used.

Oil has been conventionally used as a compounding aid in rubber compositions. Examples of oil include, but are not limited to, aromatic, naphthenic, and/or paraffinic processing oils. In some applications, it may be preferable to use low-polycyclic-aromatic (PCA) oils, particularly oils that have a PCA content of less than 3%. A typical amount of oil in a composition may broadly range from about 0 phr to about 100 phr, from about 0 phr to about 70 phr, or from about greater than 0 phr to about 50 phr, such as 15 phr, 20 phr, or 30 phr, based on 100 phr rubbery matrix in the rubber composition. In an exemplary embodiment, the multiple-acid-derived metal soap is used to replace a portion of the oil, or is used to replace the entirety of the oil in a rubber compound. For example, about 1% to about 100%, about 5% to about 50%, about 25% to about 75%, or about 10% to about 40% of the oil may be replaced by the multiple-acid-derived metal soap.

The filler may be selected from the group consisting of carbon black, silica, and mixtures thereof. The total amount of filler may be from about 1 to about 100 phr, or from about 30 to about 80 phr, or from about 40 to 70 phr, such as 50, 60, 70, or 80 phr of filler.

Suitable carbon blacks include any of the commonly available, commercially-produced carbon blacks, but those having a surface area of at least 20 m²/g and, or preferably, at least 35 m²/g up to 200 m²/g or higher are preferred. Among useful carbon blacks are furnace black, channel blacks, and lamp blacks. A mixture of two or more of the above blacks can be used. Exemplary carbon blacks include, but are not limited to, N-110, N-220, N-339, N-330, N-352, N-550, N-660, as designated by ASTM D-1765-82a.

Examples of reinforcing silica fillers which can be used include wet silica (hydrated silicic acid), dry silica (anhydrous silicic acid), calcium silicate, and the like. Among these, precipitated amorphous wet-process, hydrated silicas are preferred. Silica can be employed in an amount of about 1 to about 100 phr, or in an amount of about 5 to 80 phr, or in an amount of about 30 to about 80 phr. The useful upper range is limited by the high viscosity imparted by fillers of this type. Some of the commercially available silicas which can be used include, but are not limited to, HiSil® 190, HiSil® 210, HiSil® 215, HiSil® 233, HiSil® 243, and the like, produced by PPG Industries (Pittsburgh, Pa.). A number of useful commercial grades of different silicas are also available from DeGussa Corporation (e.g., VN2, VN3), Rhone Poulenc (e.g., Zeosil® 1165 MP0), and J. M. Huber Corporation.

If silica is used as a filler, it may be desirable to use a coupling agent to couple the silica to the polymer. Numerous coupling agents are known, including but not limited to organosulfide polysulfides. Any organosilane polysulfide may be used. Suitable organosilane polysulfides include, but are not limited to, 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxydiethoxysilylethyl)tetrasulfide, 2,2'-bis(tripropoxysilylethyl)pentasulfide, 3,3'-bis(tricycloneoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxyethoxypropoxysilyl 3'-diethoxybutoxy-silylpropyl tetrasulfide, 2,2'-bis(dimethylmethoxysilylethyl)disulfide, 2,2'-bis(dimethylsecbutoxysilylethyl)trisulfide, 3,3'-bis(methylbutylethoxysilylpropyl)tetrasulfide, 3,3'-bis(di t-butylmethoxysilylpropyl)tetrasulfide, 2,2'-bis(phenylmethylmethoxysilylethyl)trisulfide, 3,3'-bis(diphenyl isopropoxysilylpropyl)tetrasulfide, 3,3'-bis(diphenylcyclohexoxysilylpropyl)disulfide, 3,3'-bis(dimethylethylmercaptosilylpropyl)tetrasulfide, 2,2'-bis(methyldimethoxysilylethyl)trisulfide, 2,2'-bis(methylethoxypropoxysilylethyl)tetrasulfide, 3,3'-bis(diethylmethoxysilylpropyl)tetrasulfide, 3,3'-bis(ethyldi-secbutoxysilylpropyl)disulfide, 3,3'-bis(propyldiethoxysilylpropyl)disulfide, 3,3'-bis(butyldimethoxysilylpropyl)trisulfide, 3,3'-bis(phenyldimethoxysilylpropyl)tetrasulfide, 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis (trimethoxysilyl-2-methylpropyl)tetrasulfide, 3,3'-bis(dimethoxyphenylsilyl-2-methylpropyl)disulfide, and 3-octanoylthio-1-propyltriethoxysilane (NXT). Mixtures of various organosilane polysulfide compounds can be used.

The amount of coupling agent in the composition is based on the weight of the silica in the composition. The amount of coupling agent present in the composition may be from about 0.1% to about 20% by weight of silica, or from about 1% to about 15% by weight of silica, or from about 1% to about 10% by weight of silica. For example, typical amounts of coupling agents include about 2 to about 12 phr, such as 4, 6, 8, and 10 phr.

Certain additional fillers may also be utilized, including mineral fillers, such as clay, talc, aluminum hydrate, aluminum hydroxide and mica. The foregoing additional fillers are optional and can be utilized in the amount of about 0.5 phr to about 40 phr.

Antioxidants may also be used in amounts including 0.25 to 3.0, such as 0.5, 1, 1.5, 2.0, and 2.5 phr. More than one type of antioxidant may be used in conjunction.

A vulcanized rubber product may be produced from the rubber composition that includes the multiple-acid-derived metal soap described above and other additives by shaping and curing the compound. The illustrative rubber compositions described herein can be used for various purposes. For example, they can be used for various rubber products, such as a tire treadstock, sidewall stock or other tire component stock compounds. Such products can be built, shaped, molded and cured by various methods that are known and will be readily apparent to those having skill in the art. In an embodiment, a molded, unvulcanized tire is charged into a vulcanizing mold and then vulcanized to produce a tire.

The following examples are included to provide additional guidance to those skilled in the art in practicing the claimed invention. These examples are not intended to limit the invention, which defined in the appended claims, in any manner.

EXAMPLES

Example 1

To a 1.9 liter glass bottle was added 1 liter of water and 13.94 g (0.35 mol) of sodium hydroxide (99+% purity, from Aldrich). After it completely dissolved, 40.14 g (0.17 mol) of dodecanedioic acid (98+% purity, from Aldrich) was added. The mixture was then mixed vigorously at 90° C. for one hour until the solution was completely transparent ("solution A").

Then to another 1.9 liter glass bottle was added 1 liter water and 82.66 g (0.17 mol) of aluminum potassium sulfate dodecahydrate (99+% purity, from Aldrich). The mixture was then mixed vigorously at 90° C. for one hour until the solution was completely transparent ("solution B").

Finally, under vigorous stirring, solution B was slowly added into solution A at a speed of about 10 mL/sec to yield a white solid material. The white solid material was washed with pure water eight times, then dried in a vacuum at 65° C., and then at 110° C. overnight. The final product was a white powder.

Example 2

To a 1.9 liter glass bottle was added 900 mL of water and 13.94 g (0.35 mol) of sodium hydroxide (99+% purity, from Aldrich). After it dissolved, 40.2 g (0.17 mol) of dodecanedioic acid (98+% purity, from Aldrich) was added. The mixture was then mixed vigorously at 90° C. for one hour until the solution was completely transparent ("solution-A").

To another 1.9 liter glass bottle was added 900 ml water and 13.99 g (0.35 mol) of sodium hydroxide (99+% purity, from Aldrich). After it dissolved, 69.85 g (0.35 mol) of lauric acid (98+% purity, from Aldrich) was added. The mixture was then mixed vigorously at 90° C. for one hour until the solution was completely transparent ("solution-B").

To another 1.9 liter glass bottle was added 900 ml of water and 165.34 g (0.35 mol) of aluminum potassium sulfate dodecahydrate (99+% purity, from Aldrich). The mixture was then mixed vigorously at 90° C. for one hour until the solution was completely transparent ("solution-C").

Then, solution A and solution B were mixed together to produce another solution ("solution D").

Finally, under vigorous stirring, solution C was slowly added into solution D at a speed of about 10 mL/sec to yield a white solid material. The white solid material was washed with pure water eight times, then dried at vacuum at 65° C., and then at 110° C. overnight. The final product was a white powder.

Examples 3 to 5

Application of Example 2 in Rubber Compositions

Rubber compositions were prepared according to the formulation shown in Table 1. A control rubber composition (Example 3) was prepared and two test compositions (Examples 4 and 5) were also prepared by using the synthesized material of Example 2 to replace part of the aromatic oil in the compound formulation of the control Example 3. In each example, a blend of the ingredients was kneaded by the method listed in Table 2. The amounts shown in Table 1 are in parts by weight per one-hundred parts of rubber (phr). The products of Examples 1 and 2 were added in the second (remill) stage. The final stock was sheeted and molded at 165° C. for 15 minutes.

TABLE 1

|  | Example 3 (Control) | Example 4 | Example 5 |
|---|---|---|---|
| Composition for Stage 1 |  |  |  |
| SBR (33% cis, 56% trans, 11% vinyl, 23.5% styrene, −62° C. Tg) | 100 | 100 | 100 |
| Precipitated silica filler[1] | 70 | 70 | 70 |
| Aromatic Oil[2] | 30 | 15 | 15 |
| Wax[3] | 1.5 | 1.5 | 1.5 |
| Stearic Acid[4] | 2 | 2 | 2 |
| 6PPD[5] | 0.95 | 0.95 | 0.95 |
| Silane coupling agent[6] | 8 | 8 | 8 |
| Stage 2 Additions |  |  |  |
| Synthesized material from example 2 | 0 | 15 | 30 |
| Stage 3 Additions |  |  |  |
| Sulfur | 1.7 | 1.7 | 1.7 |
| N-(cyclohexylthio) phthalimide | 0.25 | 0.25 | 0.25 |
| Zinc Oxide | 2.5 | 2.5 | 2.5 |
| Cyclohexyl-benzothiazole sulfenamide | 1.5 | 1.5 | 1.5 |
| Diphenylguanidine | 0.5 | 0.5 | 0.5 |

[1]Purchased from PPG (Pittsburgh, PA) as hydrate amorphous silica, trade name Hi Sil 190G
[2]Purchased from Mobil (Fairfax, VA) under the trade name Mobilsol 90
[3]Purchased from Aston Wax Corp. (Tilusville, PA)
[4]Purchased from Sherex Chemical (Dublin, OH)
[5]Chemical name: N-(1,3-dimethylbutyl)-N'-phenyl-p-phenylene-diamine; purchased from Monsanto (St. Louis, MO) under the trade name 6PPD
[6]Chemical name: bis-(3-triethoxy-silyl propyl) tetrasulfide; purchased from Degussa (Parsippany, NJ)

TABLE 2

| Mixing Conditions | |
|---|---|
| Mixer: 300 g Brabender | Agitation Speed: 60 rpm |
| Stage 1 | |
| Initial Temperature | 110° C. |
| 0 min | charging polymers |
| 0.5 min | charging oil and Carbon Black |
| 5.0 min | drop |
| Stage 2 | |
| Initial Temperature | 110° C. |
| 0 min | charging stocks and aluminum soap |
| 5.0 min | drop |
| Stage 3 | |
| Initial Temperature | 75° C. |
| 0 sec | charging master stock |
| 30 sec | charging curing agent and accelerators |
| 75 sec | drop |

Measurement of the tensile strength, tear strength, and hysteresis loss of the Examples gave the results as shown in Table 3. As can be seen in the Table 3, examples 4 and 5 exhibited well balanced physical properties with improved wet traction.

TABLE 3

| | | Example 3 (Control) | Example 4 | Example 5 |
|---|---|---|---|---|
| Mooney (130° C.) | ML1 + 4 (MU): | 50.1 | 81.4 | 53.8 |
| Hardness (23° C.) | Shore A Mean: | 63.8 | 76.9 | 68.5 |
| Ring Tear (170° C.) | Strength (N/mm) | 16.5 | 12.1 | 12.6 |
| | Travel (%) | 311.2 | 162.1 | 286.5 |
| Ring Tensile (23° C.) | M50 | 1.44 | 2.17 | 1.51 |
| | M300 | 8.36 | 11.78 | 7.63 |
| | Tb (MPa) | 15.77 | 12.76 | 13.3 |
| | Eb(%) | 475.2 | 324.1 | 449.8 |
| Dynastat (50'° C.) | K' (lbf/in): | 254.6 | 467.2 | 325.0 |
| | K" (lbf/in): | 41.6 | 74.2 | 52.1 |
| | tanδ: | 0.164 | 0.159 | 0.160 |
| Wet Traction | Stanley London | 61 | 63.8 | 66.2 |

Measurement of tensile strength is based on conditions of ASTM-D 412 at 22° C. The test specimen geometry was in the form of a 2.54 cm diameter ring having a width of 0.127 cm and a thickness of 0.191 cm The dynamic properties were evaluated with a Oscillatory Shear Dynamic Analyzer—ARIS. The test specimen geometry was in the form of a strip having a length of 30 mm and a width of 15 mm and a thickness of 2 mm. The following testing conditions were employed: frequency 5 Hz, 2% strain.

Examples 6 and 7

Application of Example 1 in Rubber Compositions

Rubber compositions were prepared according to the formulation shown in Table 4. In both examples 6 and 7, a blend of the ingredients was kneaded by the method listed in Table 2 above. Example 6 is a control that does not contain any of the multiple-acid-derived soap. In Example 7, the product of Example 1 was added in the second (remill) stage, and replaced 15 phr of the oil of the control Example 6. The final stock was sheeted and molded at 165° C. for 15 minutes.

TABLE 4

| | Example 6 (Control) | Example 7 |
|---|---|---|
| Composition for Stage 1 | | |
| SBR (33% cis, 56% trans, 11% vinyl, 23.5% styrene, −62° C. Tg) | 100 | 100 |
| Precipitated silica filler | 70 | 70 |
| Aromatic Oil | 30 | 30 |
| Wax | 1.5 | 1.5 |
| Stearic Acid | 2 | 2 |
| N-(1,3-dimethylbutyl)-N'-phenyl-p-phenylenediamine (6PPD) | 0.95 | 0.95 |
| Bis [3-(triethoxysilyl) propyl] tetrasulfide | 8 | 8 |
| Stage 2 Additions | | |
| Synthesized material from Example 1 | 0 | 15 |
| Stage 3 Additions | | |
| Sulfur | 1.7 | 1.7 |
| N-(cyclohexylthio) phthalimide (retarder) | 0.25 | 0.25 |
| Zinc Oxide | 2.5 | 2.5 |
| Cyclohexyl-benzothiazole sulfenamide (accelerator) | 1.5 | 1.5 |
| Diphenylguanidine (accelerator) | 0.5 | 0.5 |

Measurement of the tensile strength, tear strength, and hysteresis loss on the vulcanized rubber compounds of Examples 6 and 7, gave the results shown in Table 5. As can be seen in Table 5, Example 7 exhibited well balanced physical properties with improved wet traction.

TABLE 5

| | | Ex. 6 | Ex. 7 |
|---|---|---|---|
| Mooney (130° C.) | ML1 + 4 (MU): | 50.7 | 62.3 |
| Ring Tensile (100° C.) | M50 | 1.09 | 1.07 |
| | M300 | 6.56 | 5.53 |
| | Tb (MPa) | 7.4 | 5.79 |
| | Eb (%) | 311.7 | 318.6 |
| Ring Tensile (23° C.) | M50 | 1.32 | 1.41 |
| | M300 | 8.68 | 6.75 |
| | Tb (MPa) | 17.3 | 13.36 |
| | Eb (%) | 497.8 | 532.7 |
| Hardness (100° C.) | Shore A Mean: | 59.7 | 59.5 |
| Hardiness (23° C.) | Shore A Mean: | 63.3 | 66.3 |
| Strain Swp (25° C.) 5%, 5 Hz | G' (MPa) | 4.62 | 5.91 |
| | G" (MPa) | 0.87 | 1.38 |
| | tanδ | 0.189 | 0.234 |
| Wet Traction | Stanley London | 59 | 62 |

Measurement of tensile strength is based on conditions of ASTM-D 412 at 22° C. The test specimen geometry was in the form of a 2.54 cm diameter ring having a width of 0.127 cm and a thickness of 0.191 cm The dynamic properties were evaluated with a Oscillatory Shear Dynamic Analyzer—ARIS. The test specimen geometry was in the form of a strip having a length of 30 mm and a width of 15 mm and a thickness of 2 mm. The following testing conditions were employed: frequency 5 Hz, 2% strain.

While the invention has been illustrated and described in representative embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

The invention claimed is:

1. A tire including a composition, the composition comprising:
   a polymer matrix,
   a multiple-acid-derived metal soap;
   wherein the metal has an oxidation state of +3 or +4.

2. The tire of claim 1, wherein the metal is aluminum, iron, titanium, or cobalt.

3. The tire of claim 1, wherein the multiple-acid-derived metal soap is a polymer material and includes units with formula Ia:

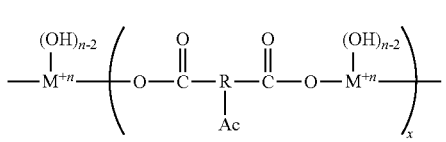

Ia wherein M is a metal with an oxidation state, n, of +3 or +4, R is any organic moiety, Ac is optional, and represents one or more moieties that include a carboxyl-, phosphoric-, phosphonic-, sulfuric-, or sulfonic-acid-derived group, which may also be bonded to a metal atom, and the letter "n" corresponds to the oxidation state of the metal.

4. The tire of claim 1, wherein the multiple-acid-derived metal soap contains an alkyl R group between acid-derived groups, wherein the R group contains about twelve to about fifty carbon atoms.

5. The tire of claim 1, wherein the multiple-acid-derived metal soap is present in the composition in an amount ranging from about 5 phr to about 100 phr.

6. The tire of claim 1, further comprising a mono-acid derived metal soap.

7. The tire of claim 1, further comprising a silica filler.

8. The tire of claim 1, wherein in a non-polar solvent, the molecules of the multiple-acid-derived metal soap combine to form a micelle structure or the structure represented by formula II:

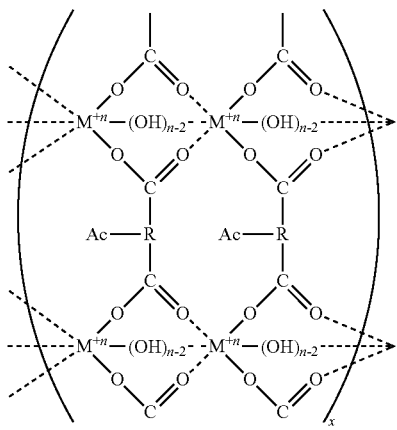

II wherein x is a positive integer; M is a metal with an oxidation state, n, of +3 or +4, R is any organic moiety, Ac is optional, and represents one or more moieties that include a carboxylic-, phosphoric-, phosphonic-, sulfuric-, or sulfonic-acid-derived group, or mixtures thereof, which may also be bonded to a metal atom, and the letter "n" corresponds to the oxidation state of the metal.

9. The tire of claim 1, wherein the multiple-acid-derived metal soap contains at least one unit of unsaturation.

10. The tire of claim 1, wherein the multiple-acid-derived metal soap is halogen-free.

11. The tire of claim 1, wherein the polymer is a diene rubber.

12. The tire of claim 11, wherein the diene rubber is selected from the group consisting of styrene-butadiene rubber, natural rubber, butadiene rubber, polyisoprene rubber, and combinations thereof.

13. A composition comprising:
   a polymer matrix,
   a multiple-acid-derived metal soap;
   wherein the metal has an oxidation state of +3 or +4;
   wherein the multiple-acid-derived metal soap is selected from the group consisting of:
      a hydrogen-bonded material wherein the mer units are multi-acid-derived molecules bonded to aluminum molecules;
      a polymer material that includes units with formula Ia:

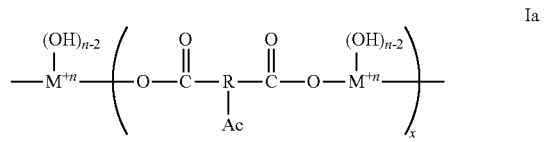

Ia wherein M is a metal with an oxidation state, n, of +3 or +4, R is any organic moiety, Ac is optional, and represents one or more moieties that include a carboxyl-, phosphoric-, phosphonic-, sulfuric-, or sulfonic-acid-derived group, which may also be bonded to a metal atom, and the letter "n" corresponds to the oxidation state of the metal;
      a multiple-acid-derived metal soap containing an alkyl R group between acid-derived groups, wherein the R group contains about twelve to about fifty carbon atoms;
      a multiple-acid-derived metal soap, wherein in a nonpolar solvent, the molecules of the multiple-acid-derived metal soap combine to form a micelle structure or the structure represented by formula II:

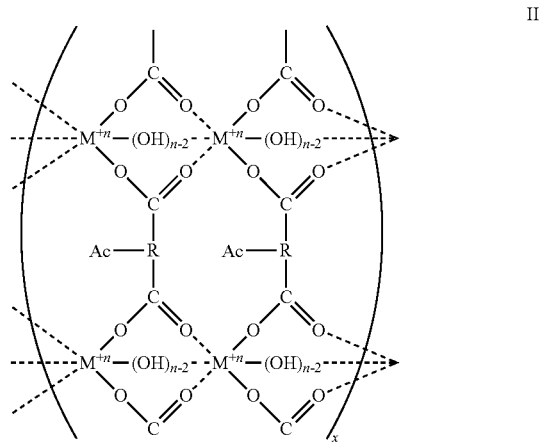

II wherein x is a positive integer; M is a metal with an oxidation state, n, of +3 or +4, R is any organic moiety, Ac is optional, and represents one or more moieties that include a carboxylic-, phosphoric-, phosphonic-, sulfuric-, or sulfonic-acid-derived group, or mixtures thereof, which may also be bonded to a metal atom, and the letter "n" corresponds to the oxidation state of the metal; and a multiple-acid-derived metal soap containing at least one unit of unsaturation.

14. The composition of claim 13, wherein the metal is aluminum, iron, titanium, or cobalt.

15. The composition of claim 13, wherein the multiple-acid-derived metal soap is halogen-free.

16. The composition of claim 13, wherein the diene rubber is selected from the group consisting of styrene-butadiene rubber, natural rubber, butadiene rubber, polyisoprene rubber, and combinations thereof.

17. The composition of claim 13, wherein the multiple-acid-derived metal soap is present in the composition in an amount ranging from about 5 phr to about 100 phr.

18. The composition of claim 13, further comprising a mono-acid derived metal soap.

19. The composition of claim 13, wherein the multiple-acid-derived metal soap further comprises a species of formula Ib:

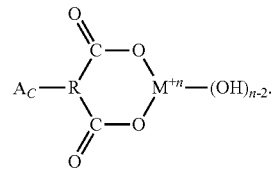

20. The composition of claim 19, wherein the percentage of formula Ia species in a total amount of multiple-acid-derived metal soap in the composition is about 80% to about 99%.

21. A composition comprising:
a polymer matrix,
a multiple-acid-derived metal soap;
wherein the metal has an oxidation state of +3 or +4;
wherein the multiple-acid-derived metal soap is a multiple-phosphoric or -phosphonic-acid-derived metal soap or a multiple-sulfuric or sulfonic-acid-derived metal soap.

22. The composition of claim 21, wherein the metal is aluminum, iron, titanium, or cobalt.

23. The composition of claim 21, wherein the multiple-acid-derived metal soap is halogen-free.

* * * * *